United States Patent [19]

Manning

[11] 4,390,954
[45] Jun. 28, 1983

[54] OVERRIDE CONTROL APPARATUS AND METHOD FOR PARAMETER ADJUSTMENT OF DIGITALLY BASED WELDING PROCESS PROGRAMMERS

[75] Inventor: Richard P. Manning, Nashville, Tenn.

[73] Assignee: Merrick Engineering, Inc., Nashville, Tenn.

[21] Appl. No.: 253,861

[22] Filed: Apr. 13, 1981

[51] Int. Cl.³ .............................................. G06F 15/46
[52] U.S. Cl. ................................ 364/477; 219/130.5; 364/189
[58] Field of Search ............... 364/172, 188, 189, 477; 219/121 EA, 121 ED, 121 EX, 124.1, 124.21, 130.21, 130.5, 130.51

[56] References Cited

U.S. PATENT DOCUMENTS

| | | | |
|---|---|---|---|
| 3,689,734 | 9/1972 | Burley et al. | 219/130.5 |
| 3,838,244 | 9/1974 | Petrides et al. | 219/130.5 |
| 4,019,016 | 4/1977 | Friedman et al. | 219/130.21 X |
| 4,074,350 | 2/1978 | Roch et al. | 364/188 X |
| 4,104,724 | 8/1978 | Dix et al. | 364/477 |
| 4,189,765 | 2/1980 | Kotalik et al. | 364/188 |
| 4,301,351 | 11/1981 | Mathews | 364/477 X |

Primary Examiner—Jerry Smith

[57] ABSTRACT

An override control apparatus and method for parameter adjustment of digitally based welding process programmers is provided for making modifications to a pre-programmed weld parameter schedule during real time welding. Initial values for welding head current are initially provided to a programmer, and during the real time welding interval, means are provided for overriding and updating the data. The programmer repetitively and frequently makes calculations so that the output value of current supplied to the welding head is provided frequently. In addition to the current output signal, a speed output signal is provided to control the speed of the welding head relative to the workpiece. The current output and speed output signals are generated with the same time base in synchronism.

10 Claims, 12 Drawing Figures

| INTERVAL | TIME SEC | CURRENT AMPS | PULSE X | SPEED RPM | PULSE X | FREQ HZ | % ON TIME |
|---|---|---|---|---|---|---|---|
| PREFLOW | 1.0 | | | | | | |
| 1 | 15.0 | 5.0 | 2.00 | 2.0 | 5.00 | EXT | |
| 2 | 1.0 | 1.0 | 5.00 | 9.5 | 0.50 | 0.1 | 90 |
| 3 | EXT | 2.0 | 2.50 | 9.0 | 0.56 | 0.4 | 10 |
| 4 | 100.0 | 3.0 | 1.67 | 8.0 | 0.63 | 1.5 | 80 |
| 5 | 10.5 | 4.0 | 1.25 | 7.0 | 0.71 | 5.6 | 20 |
| 6 | EXT | 5.0 | 1.00 | 6.0 | 0.83 | 22.7 | 70 |
| 7 | 25.0 | 6.0 | 0.83 | 5.0 | 1.00 | 88.1 | 30 |
| 8 | 25.0 | 7.0 | 0.71 | 4.0 | 1.25 | 342.0 | 60 |
| 9 | 25.0 | 8.0 | 0.63 | 3.0 | 1.67 | 1327.0 | 40 |
| 10 | EXT | 9.0 | 0.56 | 2.0 | 2.50 | 5153.0 | 50 |
| 11 | 100.0 | 10.0 | 0.50 | 1.0 | 5.00 | 19999.0 | 95 |
| POSTFLOW | 1.0 | 0.0 | | 0.0 | | | |

ELAPSED TIME = 29   EMERGENCY STOP   CURRENT CHANGED   SPEED CHANGED

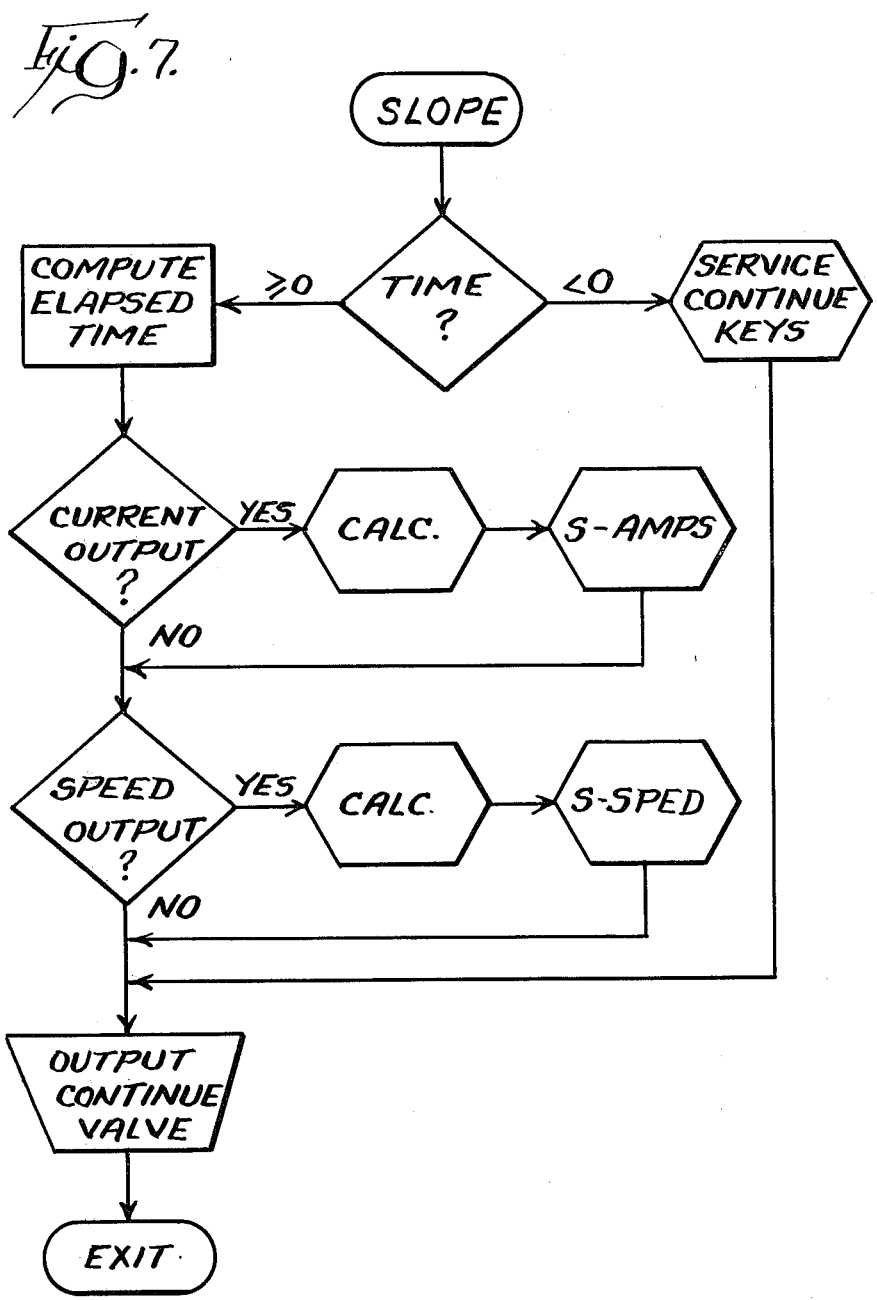

OVERRIDE CONTROL APPARATUS AND METHOD FOR PARAMETER ADJUSTMENT OF DIGITALLY BASED WELDING PROCESS PROGRAMMERS

DESCRIPTION

1. Technical Field

This invention relates to an apparatus and method for making modifications to a pre-programmed weld parameter schedule during real time welding.

2. Background of the Invention

Arc welding technology has made recent advances with the introduction of automatic controls which attempt to control weldment characteristics by regulation of measurable quantities which, through theoretical and empirical studies, have been shown to correlate strongly with mechanical and metallurgical properties of the weldment. For critical applications where weldments of extreme reliability are required, it has been found advantageous to experimentally develop schedules which contain many measurable quantities. The welding process is regulated to duplicate these conditions during the production of each part, thereby insuring a high percentage of acceptable weldments.

Weld programmer instruments have been used as a means for duplicating conditions during successive weldments. These programmers have provided a means for storing weld parameters for later repeated use. The programmed welding schedule is affected by one or more signals which vary in time and act as commands to various equipment which produce the required welding conditions. The controlled equipment typically would include welding power sources, and positional mechanisms to move the welding heat source relative to the work material being welded. This equipment typically requires electric signals of the analog variety. Therefore, the purpose of the welding programmer would be to store and reproduce these analog signals in the proper amplitude and at the proper times that a desirable weldment could be achieved.

Attempts have been made to generate analog signals in a program in order to accomplish the production of analog signals to control welding power sources and positional mechanisms to position the weld head relative to the work piece being welded. The early technology in this area has involved the use of large relay panels using analog signals virtually exclusively. An early 1960's version of a programmed power supply involved the use of ganged modules, with each module having its own timer and sloper function. Each module had a current dial, typically a direct reading multiturn potentiometer, which was the only visual output provided for the operator.

Later attempts at weld programming devices have involved use of graphic type displays. The front panel of such a device would a graph of programmed current as a function of time. Timing information would also be provided with readout in seconds, with sequential lighted push buttons to indicate the progress of the program. Current dials read out directly in amperes, showing upslope and downslope in graphlike fashion. Improvements on this type of device involved equipment for additional slope and additional initial current timer mechanisms. Also, digital thumbpots replaced the multiturn potentiometers and dials for easier data entry.

With these devices, the sloping functions were generated by two oppositely moving slope circuits, using operational amplifiers and integrating capacitors, and thus operated only by using analog signals. Thus, any slope can be either upward, flat, or downward depending on how the particular current dials were set. Also, positional controls were provided so that the speed of the moving work part relative to the welding head could be varied during the program. However, these programmers were analog timer based, and created some difficulty in coordinating the functions between analog current production and analog speed control production. Also, these programmers were limited from a physical standpoint, because as the complexity of the weld programmer increased, due to the more complex weld programs, their limited capability was soon realized. For instance one such device had five slopes and two non-sloping timers, including pre-flow and post-flow, and this particular device approached the physical limit as to number of functions which could be physically provided on the front control panel of the device. Further, since the adjustments were made each time that the program was desired to be run, operator error was introduced because of setting a multiplicity of controls each time the program was run.

In recent years digital based programmers have been used. While more accurate in feeding in parameter data, these programmers were also limited since many of them provided current adjustment only in steps, and did not provide a continually and gradually sloped output.

Thus on the one hand, if an analog system is used to provide signals to a weld head and positional device, the disadvantage of such a device is in feeding in the data to the program and of easily visualizing resultant program from the readout of multiturn potentiometers and the like. On the other hand, a purely digital system, while possibly offering more accurate data entry and providing visual displays such as multiturn potentiometers and the like which might be more understandable to the welding operator, still do not offer the slope generating capability since most of these produce multiple step outputs.

From a flexibility standpoint, both of these above systems do not offer much of an ability to change the format of the program to suit the complexity of the particular welding application. One type of part may require a simple programmer while another interval of the weld program might require multiple slopes and at the same time require a speed output component. While complex programmers might be capable of doing simple work, the operator needs to enter various "null" values in order to use only a portion of the full capability of the machine. Obviously, the ability to change the format without having to enter such null values would be an advantage.

From a compatibility standpoint, the ideal weld programmer should have a provision for sequencing and controlling such things as wire feed, arc voltage, and speed of the relative motion between the work piece and the welding head. While it may be possible to control these with the analog programmer, because of timer accuracies, consistent synchronization of multiple timing functions is not really feasible. While digitally based programmers with crystal controlled or line frequency derived clocked-timers might to some extent solve this problem, they are mostly subject to the disadvantage above wherein step outputs and not continuous outputs are provided. Also, the ability of prior programmers to provide pulsing outputs has been limited.

One most also consider the environment within which the welding programmer is to be produced. While an extremely versatile machine may be well suited for a lab environment, the machine may not be durable under hostile industrial environments. While a certain machine may be rugged and reliable, it may not be as flexible as other machines which are not as reliable in hostile environments. One further consideration is the noise immunity of the programmer to outside electrical interference, the primary one being electromagnetic interference from the weld head itself.

SUMMARY OF THE INVENTION

In accordance with the present invention, a method and apparatus for controlling one or more variables in a welding process is provided with means for inputting an initial program prior to the actual welding sequence, along with means for altering or overriding the initial program during real time operation of the welding process.

An apparatus for controlling a welding control parameter for a welder during a welding process comprises a storage means for storing program data representative of the length of a time interval over which welding is to occur, an initial value of power to be supplied to a welding head at the beginning of said time interval, and a target value of power to be supplied to a welding head at the termination of said time interval. Manually actuable input means for changing said target value during said time interval is also provided. This provides a means to override the initial values provided to the programmer during the actual time interval. A calculating means is provided for repetitively and frequently calculating, during said time interval, the instantaneous values of power to be supplied to a welding head according to the equation: $X(t)=(X1-X0)t/T+X0$. An output signal $X(t)$ is provided to a weld power supply which supplies power to a weld head as dictated by the value $X(t)$. Therefore, the amount of power supplied to the welding head is calculated repetitively and frequently and adjustments can be made to the amount of power supplied to the welding head in real time during the actual welding interval.

Also in accordance with the present invention, a method of controlling a welding parameter during a welding process comprises a number of steps. One step is in providing a programmer with data representative of: the length of a welding process time interval, an initial value of power to be supplied to a welding head at the beginning of said time interval yet to be commenced, and a target value of power to be supplied to a welding head at the termination of the time interval yet to be commenced. Another step is in providing the programmer with data repesenting desired changes to said target value during the time interval. Another step is repetitively and frequently calculating during said time interval, the instantaneous value of power to be supplied to the welding head according to an equation which is the same equation used in the apparatus. The last step is in providing power to a welding head during the interval in an amount given by the value given by the equation, whereby the amount of power supplied to the welding head is calculated repetitively and frequently and whereby the adjustments can be made to the amount of power supplied to the welding head during the actual welding interval.

BRIEF DESCRIPTION OF THE DRAWINGS

In the accompanying drawings forming part of the specification, and in which like numerals are employed to designate like parts throughout the same, FIGS. 1A and 1B comprise a block diagram of the programmer weld system of the present invention;

FIGS. 5–7 are flow charts showing various routines and sub-routines of the present invention.

DETAILED DESCRIPTION OF THE PREFERRED EMBODIMENT

Figure 1A:
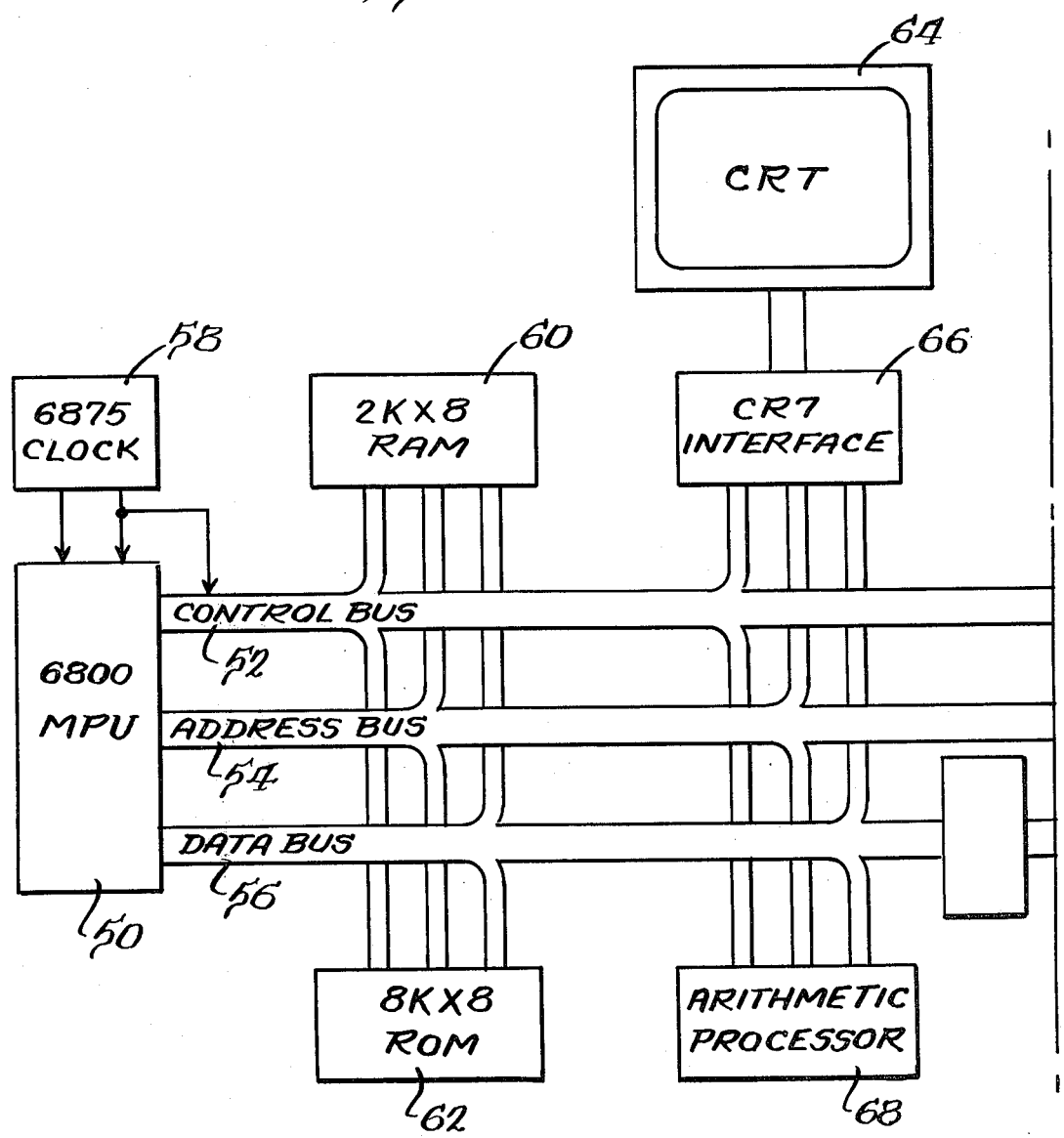
FIG. 1C is a plan view of a keyboard of the present invention.

While this invention is susceptible of embodiment in many different forms, there is shown in the drawings and will herein be described in detail one specific embodiment, with the understanding that the present disclosure is to be considered as an exemplification of the principles of the invention and is not intended to limit the invention to the embodiment illustrated.

The apparatus and method of the instant invention provides a means for controlling two format control parameters in conjunction with a welding system. The two parameters are typically (1) current of the weld head and (2) speed of the weld head relative to a fixed work device, or vice versa. The information fed into the programmer is in digital form, but the output signals to drive the weld head and positional device are analog signals. Also, either one or both of the two output analog signals can be pulsed with a selected frequency, percent ontime, and between a selected minimum and maximum value. A total of eight combinations of output signals for the two parameters are thus provided. The first combination is current output with pulsing and speed output with pulsing. The second combination is current with pulsing and speed without pulsing. The third combination is current without pulsing and speed without pulsing. The fourth combination is current with pulsing but with no speed signal outputted. The fifth combination is providing current output only, without pulse, and without a speed signal. The sixth combination is current without pulsing and speed with pulsing. The seventh combination is speed with pulsing, but without a current signal. The eighth combination is providing a speed output signal only, without pulsing.

For purposes of illustration, the first combination will be used since this involves the greatest number of control parameters. Of course the other combinations will be understood since they involve control of fewer parameters.

Figure 1B:
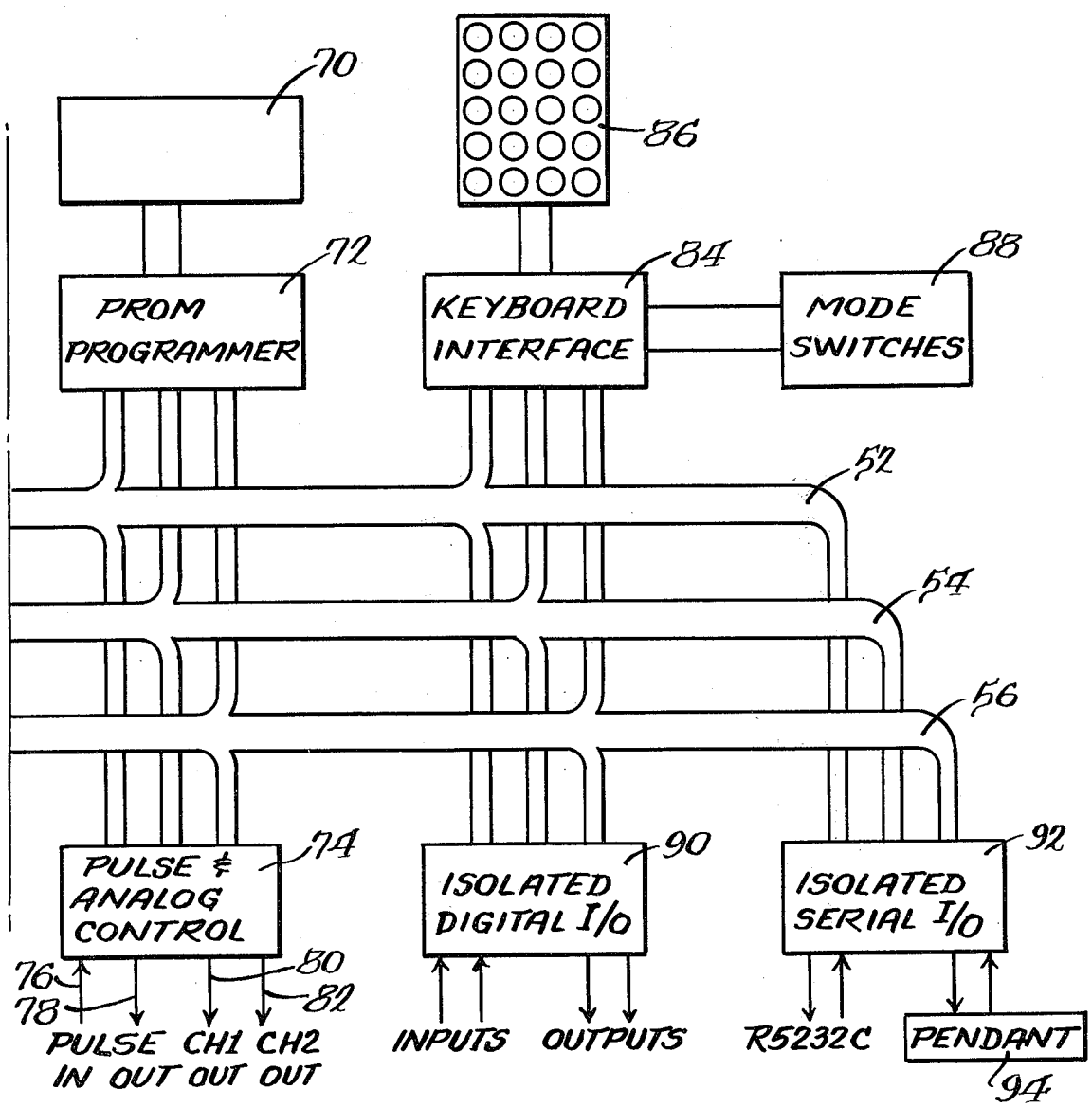
Figures 1C, 2:
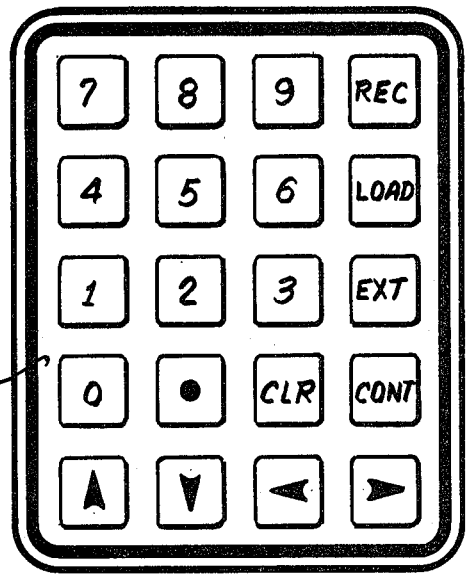
FIG. 2 is a table showing a sample dual channel weld program for use in the present invention.

Turning now to FIG. 2, the means and method for programming the machine will now be described in greater detail. The apparatus provides for programming a weld head through a series of intervals, plus pre-flow and post-flow. FIG. 2 shows eleven of those intervals with the relevant data shown for each interval. For each interval, the apparatus is provided with relevant data so that the weld head can execute the weld. The first column shown in FIG. 2 is the identification of the interval. Of course any number of intervals can be chosen and once the number is chosen, and if the number chosen is less than the full capability of the particular machine, need to input various "null" variables is dispensed with, thereby eliminating the entry or display of extraneous data. The overall system performance is also improved by eliminating unnecessary computations since only the needed information is entered and displayed.

The second column in FIG. 2 displays the time, in seconds, of that particular interval. This of course can be set by the operator. The third column displays the current in amperes which is supplied to the weld head for that particular interval. It should be noted that the current, as well as the speed, will vary linearly between the initial value of that interval given as the value on that line of the display and the final value of that interval shown on the next line of the display.

With brief reference to FIG. 3, showing interval i, the initial value is given as X0, and the final value is given as X1. The time of the interval is represented by T, and the output will be determined by the elapsed time which that interval has already run, as dictated by t. The output is then given by the equation $X(t)=(X1-X0)t/T+X0$. This realization is an improvement on other systems which uses a formula similar to $X(t+dT)=X(t)+dX$, where dT and dX are fixed quantities. An advantage of the former equation over the latter equation is that the former equation is self correcting if an update interval (dt) is missed due to other processing demands. Also, the former equation, which is used in the invention, allows manual override of welding parameters, which will be described more fully below.

Figure 4:
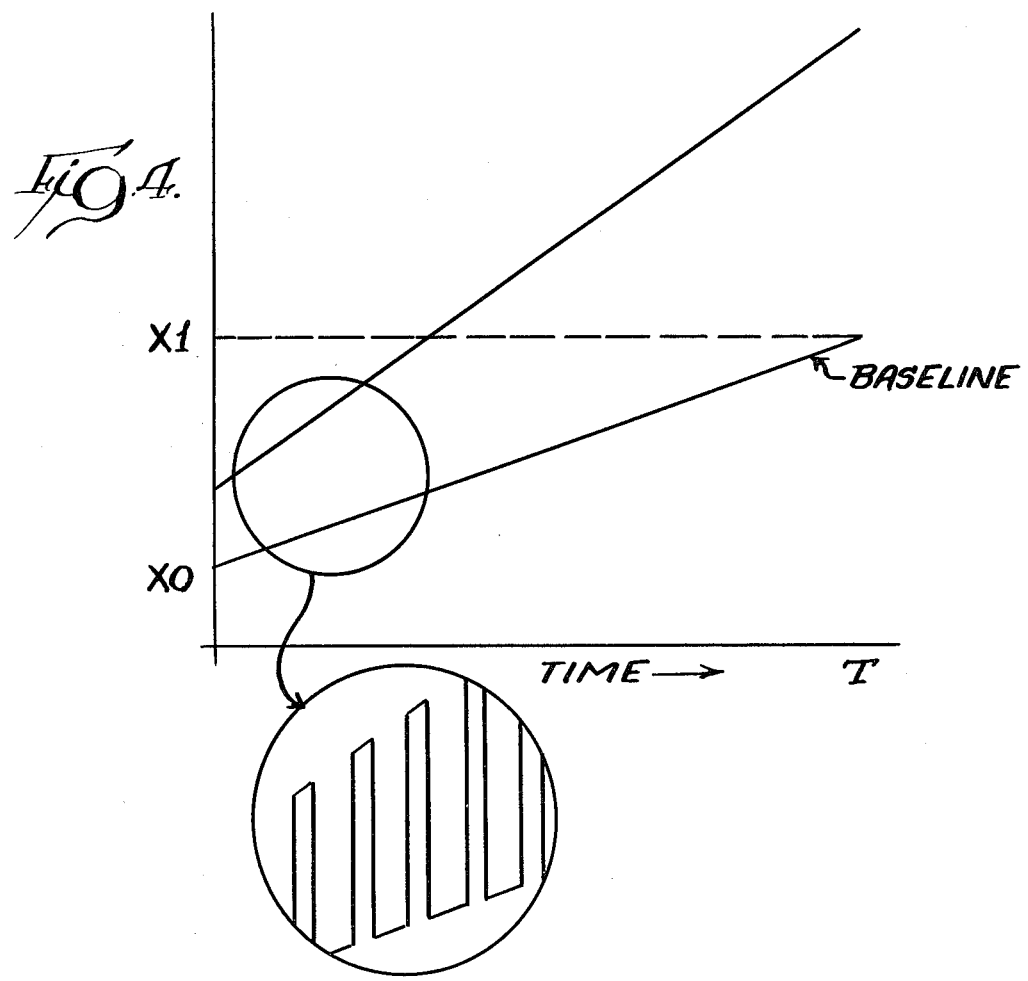
FIG. 4 is a graph of an analog output signal plotted versus time wherein the output signal is pulsed between a base value and a multiplier of the base value.

Turning again back to FIG. 2, a third column contains a pulse multiplier factor for the current. With reference briefly to FIG. 4, a base pulse value is chosen, and the pulsing varies between this base value and a value which equals the product of the base value and the pulse multiplier value. This is to be distinguished from other systems wherein merely two levels are given, i.e., minimum and maximum, or wherein a minimum plus a pulse amplitude value dX is given. The advantage of using the modulator or a pulse multiplier method is that a pulse multiplier can be either greater than unity for increased output or less than unity for reduced output, and can be adjusted in real time.

Returning now to FIG. 2, column 5 contains a value for the speed, in r.p.m., of the weld head relative to the work device. A value of r.p.m. is given because normally the speed is controlled by a servo motor or the like. As with the current pulsation, a pulse multiplier or modulator is also available for the speed output, and this value is shown in column 6 of FIG. 2.

Columns 7 and 8 of FIG. 2 contain values of the frequency of the pulsing for that particular interval and the percent on time of the maximum pulsing value for that particular interval. It should be understood that both the current output and the speed output are synchronized in real time so that the frequency and percent on-time given in columns 7 and 8 applies to both the current and the speed output, if both of the outputs are pulsed. Of course if only one of the outputs are pulsed, this pulsing data provided in columns 7 and 8 would apply only to that particular output value.

It should be noted that if the configuration chosen provides for both the current or speed to be pulsed for some but not all intervals providing a pulse multiplier of 1.00 will facilitate no pulsing on that interval since the pulse-on amplitude will equal the base.

When initially feeding the programmed data into the programmer, means are provided for insuring that the operator is an authorized user. Thus, two switches provided on the programmer in digital form, which must be set to the right number in order for the operator to gain access to the programmer.

After access to the programmer is obtained by entering the proper authorization code, a configuration code is entered. The configuration code determines which of the eight combinations of the two channels with and without pulsing is to be used. The configuration code dictates which of the eight combinations, listed above, is to be used for the programmer.

After the configuration code is entered into the programmer, the operator selects the number of intervals and thus matches the welding system to the particular job to be done. After data representing the number of intervals as inputted into the programmer, data for the pre-flow interval, numbered intervals, and post-flow interval are entered into the programmer by the operator.

In a preferred embodiment, a cathode ray tube (CRT) is used to display the data as represented in FIG. 2. On the front of the programmer, manually actuable switches as shown in FIG. 1C are provided for inputting the data by the operator. Using conventional CRT refresh and display techniques, messages are flashed on the CRT asking the operator to input the data. Also, a cursor is projected on the screen and indicates the position where the programmer requests data to be inputted by the operator. The operator then keys in the data using the keyboard of FIG. 1C and as soon as the data for that particular entry position is inputted, the cursor moves on to the next entry position. However, if the operator desires to input data out of this sequence, he can actuate any one of the up, down, left or right arrow keys on the keyboard of FIG. 1C and the cursor will respond and move to the position as directed by the operator. The up, down and left, right arrow keys of FIG. 1C, in addition to being used in this way for inputting the data to initialize the program, are also used to override the program during real time welding, as will be described below. Also, the up, down and left, right arrow keys can edit a previously entered data entry by moving the cursor to the desired data entry location and inputting the corrected data. Instead of providing numerical data in a particular data entry position, the operator can manually actuate the switch designated EXT which will cause the letters EXT to appear in that particular data entry position. With reference to FIG. 2, EXT appears in the time column for intervals 3, 6 and 10. When EXT is in the time location and the program is run, the program holds at this interval and provides the initial output values continually without change until an external command is received to exit the interval. If the EXT is in a frequency location, the program accepts an external frequency source for pulsation control. The external command is provided by pressing the key designated CONT on the keyboard or by closing a contact across a CONT input on the back of the programmer.

Once all the data has been entered and the welding sequence is desired to be entered into, the actual weld program will be executed. The first sequence entered into is the pre-flow interval during which time inert shielding gas is purged through the welding torch in preparation for the start of the welding current. There is no current flow during pre-flow and consequently no value for current is given next to pre-flow in the table of FIG. 2. Normally the welding arc or welding head is struck on a stationary workpiece and consequently no value for speed is given for pre-flow either. It should be noted that during the postflow interval, like during the preflow interval, current and speed output signals are not provided. During the postflow interval, the shielding gas continues to flow.

For the interval in progress, the CRT will highlight that interval by reverse video. The reverse video will thus highlight the numbered intervals in sequence. During the particular highlighted interval in progress, eight particular values for time, current and speed are updated from their initial values to reflect the value dictated by the computation equation referred to above and described in conjunction with FIG. 3A. During this time, the operator can override or change the values in the table by actuating override controls on the keyboard of FIG. 1C which will either be provided on the front of the main programmer or on a remote pendant control.

Figure 3A:
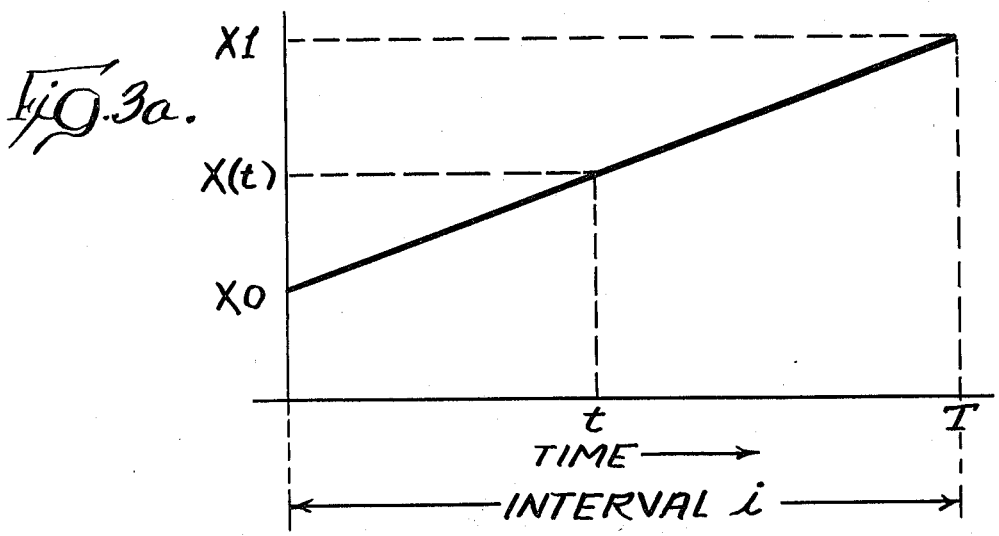
FIG. 3A is a graph showing one of the analog output signals plotted as a function of time for one interval of the program.
Figure 3B:
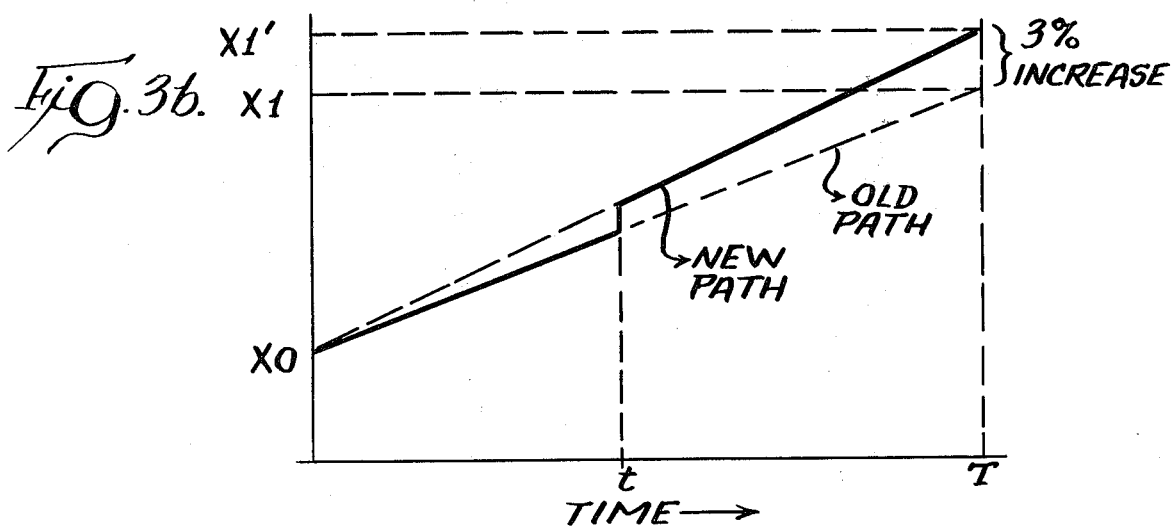
FIG. 3B is a graph showing one of the analog output signals plotted versus time for one interval wherein an override increase command is provided at time and where the output signal is given by one version of an output equation.

During the welding process, the arrow keys are used for the manual override. The up arrow and down arrow keys, respectively, increase and decrease the channel 1 output, which is normally the current analog signal output, and the arrow right and arrow left keys, respectively, increase and decrease the channel 2 output, which is typically the speed analog signal output. The override is achieved by altering the final or target value of the slope as shown in FIG. 3B if the interval is in a "timed" mode (i.e. not an "external" mode). Specifically, each time an arrow key is actuated, a three percent change in final value is made. Thus, with reference to FIG. 3B, a particular output signal of either current or speed will jump from an old path to a new path. The changes in the override are retained by the programmer and thus no further changes are required for following welds. Also the occurrence of a change is displayed at the bottom of the CRT display. The program proceeds through each of the numbered intervals in sequence, with the active interval being highlighted by reverse video on the CRT. While FIG. 3B shows an override jump of three percent increase for a value X1, it is understood that this pertains either to the current value or the speed value depending upon whether the respective up arrow key or left arrow key, respectively, is actuated.

Figure 3C:
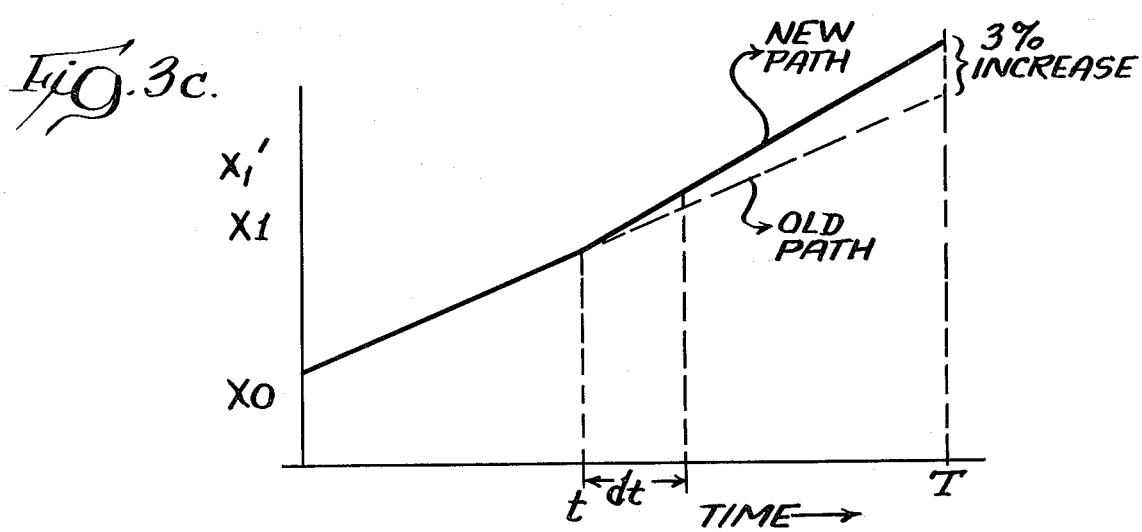
FIG. 3C is a graph showing one of the analog output signals similar to FIG. 3B but where a second version of an output equation is used.

FIG. 3C shows an override response when a different output equation is used. Here the transition is not a step, but is continuous.

Figure 3D:
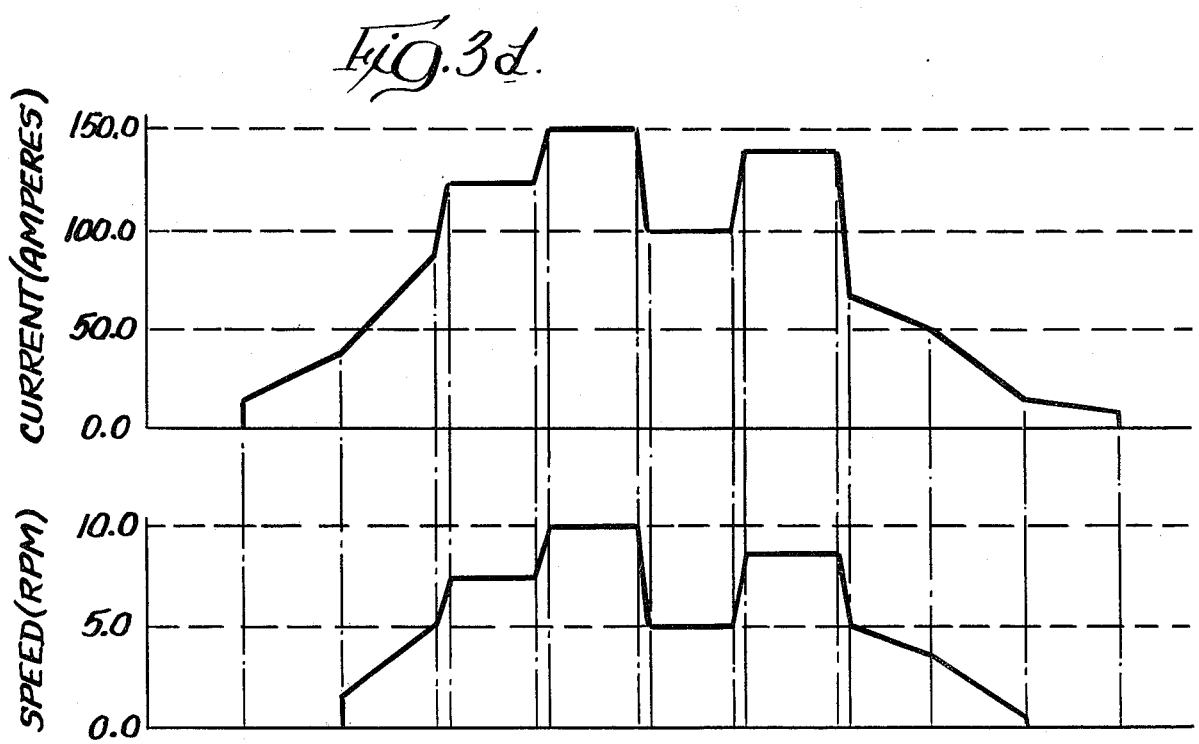
FIG. 3D is a graph showing a plot of current and speed output signals plotted against time wherein the output signals are synchronized over a number of time intervals.

FIG. 3D shows a number of graphed intervals in cascade with two output channel values, current and speed, plotted against the same time base in synchronism.

Of course, during real time run of the program, an entry of EXT in the time entry position will cause a program to hold the initial value of current or speed throughout the entire interval until an external override signal is inputted to the programmer. Thus, since the output signals remain constant, there is no sloping between initial and final values and when manual override is provided, the initial rather than the final value is the value that is altered.

To facilitate the actual changing of values during running of the program from updating and override control, a number of sequences are used for calculating the output values. The overall sequence will now be described in conjunction with FIGS. 5, 6 and 7.

Figure 6:
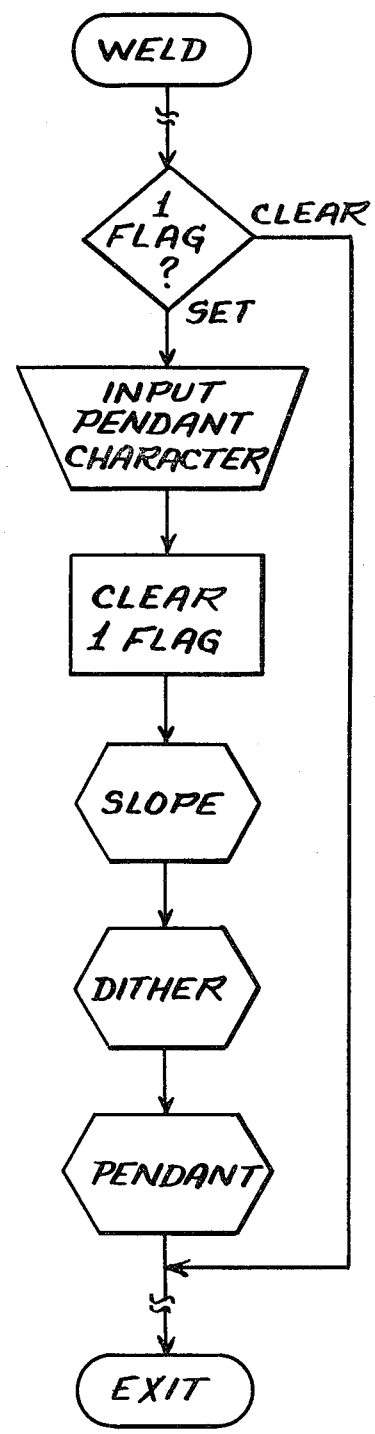

Turning now to FIG. 6, the Weld routine will now be described in greater detail. The Weld routine is the primary routine for controlling the welding process. The main portion of the Weld routine is entered into sixty times a second, which is how often the variable 1FLAG is set. The variable 1FLAG is set external to the Weld subroutine. Of course if the 1FLAG is clear, the main portion of the Weld routine is not performed and the routine is exited.

At the beginning of each normal welding interval, the program initializes the welding parameters for that particular interval. Also, the incremental adjustment values are computed by executing a subroutine which locates the target (X1) value and executes a subprogram called INCA to perform the actual computation. Subprogram INCA computes three percent of the target current and stores the resulting value to a variable designated DA in memory. Subprogram INCA also computes three percent of the target speed and stores the value to a variable designated DS in memory. The values are available later when incremental upward and downward adjustments of the current and speed are desired.

The target values within each interval are modified by the execution of the Dither and Pendant in the Weld routine if the time interval is timed, i.e. not externally controlled. If the time interval is externally controlled, the values that are modified are the initial, constant values for that interval. The Dither subroutine services the four front panel "arrow" keys on the keyboard and the Pendant subroutine services similar "arrow" keys from a remote pendant keyboard. In one particular form of the apparatus, if the remote pendant is electrically and mechanically hooked up to the external interface connector of the main control unit, then the program will sense switch closures from the pendant keyboard. Of course, if the pendant remote unit is not hooked up, then the program will sense switch closures only from the front panel keyboard of the main processor unit. This scanning of pendant switch closures is represented in the Weld program by the block "Input Pendant Character."

Figure 5:
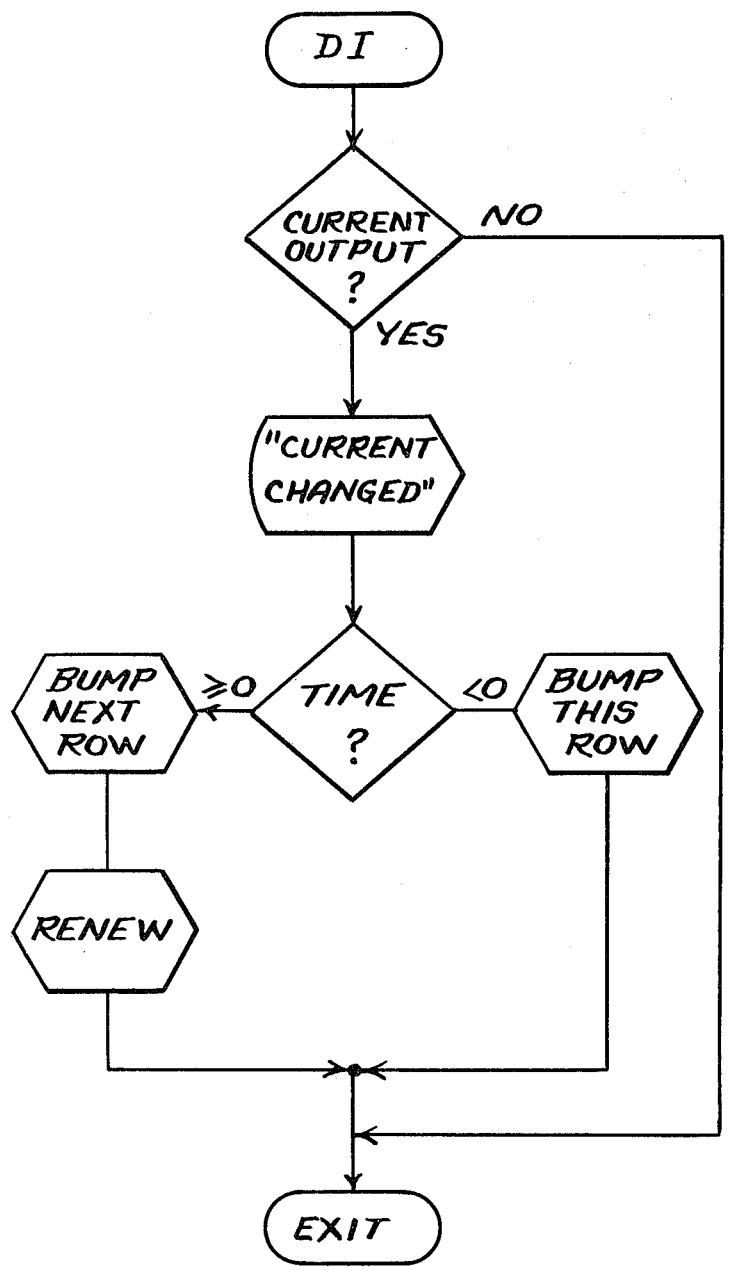

In both the Dither and Pendant subroutines, a subroutine called Tiddle performs the modifications to the welding control program. The Tiddle subroutine increments and decrements current and speed. FIG. 5 shows the subroutine DI which determines the value to be modified and then updates the display.

In the DI subroutine, a check is first made to determine whether the present interval calls for a current output signal to be produced. If not, the subroutine is exited. If a current signal is called for, the CRT is provided with a message indicating "Current Charged" which indicates that an override is occurring. A check is then made to determine whether the interval is time or external. If the interval is timed, then the data entry value in the schedule that is changed (bumped) is the target value for that interval, i.e. the data entry value for current in the next interval row. If the interval is not timed, but is controlled externally, then the output current is presently constant as a function of time, and the variable of "time" is less than zero, and the data entry value in the schedule that is to be charged (bumped) is the initial for that interval, i.e. the data entry value for current in the present row.

Since all values in the present interval and row are highlighted in reverse video and are continually updated as the interval progresses, there is no additional need to update or "renew" the initial value within the interval if the command "Bump This Row" is executed. However, since only the values in the present interval are updated, the program must be told to "renew" the target value in the next row. That is why the command "Renew" is present in the left side of the chart of FIG. 5, but is not in the right side. While the illustrated FIG. 5 shows the subprogram DI for the current (amperes) output adjustment, the same or a similar program can be used to modify or change the speed adjustment.

The actual computation of the output value for both current and speed are updated in the Slope subroutine which is part of the Weld routine of FIG. 6. The Slope subroutine is shown in FIG. 7. In the Slope subroutine, the function CALC is the realization of the equation described above, i.e. $X(t)=(X1-X0)t/T+X0$. Alternatively, the equation used could be $X(t+dt)=(X1-X(t))t/(T-t)+X(t)$. The former equation will result in a jump as shown in FIG. 3B and the latter equation will result in a smooth transition as shown in FIG. 3C. The result of CALC is the desired parameter (either current or speed) in engineering units. The values are scaled to match the associated welding equipment and output by calling S-AMPS or S-SPED which scale the value $X(t)$ to match the particular welding equipment being used. These scaling routines also provide for clipping of any overrange values, i.e. values which fall outside the range of the equipment.

In the beginning of the Slope subroutine, a check is made to see whether the interval is "timed" or whether the timing control is external i.e. EXT. If the interval timing is external, the time variable will be less than zero and the program will proceed to the right and service the continue keys (CONT key on keyboard 86 of FIG. 1C) to see whether an operator has commanded the program to exit that particular interval.

If the interval is timed, the time variable is recomputed and a check is made to see whether the program is in one of the eight configurations when current is to be outputed. If it is, the subroutine CALC is called which computes the row value of current according to one of the two equations above for $X(t)$ or $X(t+dt)$. The result of this computation is then scaled before being outputed to an external control. A similar check is then made to see whether a speed output is being outputed, depending on whether the program is one of the eight configurations calling for speed to be outputed. If it is to be outputed, the variable speed is calculated in a manner similar to the calculation for the current variable.

Referring now to FIGS. 1A and 1B, a block diagram of the system of the program will now be described. A microprocessor unit system is based upon the Motorola M6800 family. It is comprised of microprocessing unit 6800 designated by reference numeral 50 which has control bus 52, address bus 54 and data bus 56 interconnected with other units in the family. An external clock 58 which is preferably a 6875 clock and provides clocking for the microprocessor. The memory units are comprised of a 2KX8 RAM unit 60 and an 8KX8 ROM unit 62. The CRT unit 64 is interfaced with the control, address and data buses with a CRT interface unit 66. An arithmetic processor unit which is preferably an AM9511 ADC APU unit 68 is provided for high speed mathematical computation. The APU 68 is also connected to the control, address and data buses 52, 54 and 56, respectively.

Referring now to FIG. 1B which is a continuation of FIG. 1A, one will see that the PROM unit 70, preferably an Intel 2716 or a Texas Instruments 2516 or equivalent is interfaced with a PROM programmer 72 to the control, address and data buses. A pulse and analog control unit 74 is capable of receiving pulses on line 76, outputting pulses on line 78, and outputting analog output signals on lines 80 and 82 for channels 1 and 2, respectively. As described elsewhere, channel 1 preferably provides the current analog output signal and channel 2 provides the speed analog output signal.

A keyboard interface 84 interfaces a keyboard 86, also shown in FIG. 1C with the control, address and data buses. The keyboard interface 84 also interfaces the mode switches 88 with the various buses. An isolated digital input/output interface unit 90 provides interfacing between various external input control sources and outputs to various other external units. For example, for those functions which do not require an analog control voltage, such as start and stop of carriage, oscillator, etc., an open collector transistor output switch is on during each of the intervals. That is, each interval has an output transistor suitable for driving a relay.

An isolated serial input/output interface 92 is provided for providing serial signals to and from a pendant unit 94 which can have a keyboard similar to keyboard 86 on the programmer which is shown in FIG. 1C.

The precise manner in which the MPU 6800 is programmed can be obtained from publications available from Motorola Semiconductor Products, Inc. of Phoenix, Ariz., entitled "M6800 Systems References and Data Sheets," and "Programming Manual M6800 Microprocessor," both published in 1975.

The apparatus is provided with means for setting scale factors so that the analog signals produced by one of the two outputs channels are reflective of the desired values entered in for current and speed. This is necessary because of the different response characteristics of the welding head and the servo motor for welding and positional adjustment, respectively.

There is a separate scale factor set for channel 1 and channel 2, i.e. current and speed respectively. These settings determine the correspondence between a numerical entry and output voltage. For example, suppose the scale factor setting for channel 1 is 500. An entry of 500 in the current column will cause an output of 10 volts d.c. from channel 1 of the programmer. A numerical entry of 100 in the current column will cause an output of two volts d.c. from channel 1. It is then possible to use the programmer with power supplies of various current capacities. A similar example could be given for channel 2 which may require various units of speed in r.p.m., i.p.m, and f.p.m. The scale factor serves to place the programmer in the correct numerical range for any particular application.

Scale factors for the channels preferably are eight in number and for channel 1 are 50, 75, 100, 150, 300, 500, 750, and 1,000. For channel 2 they are 10, 75, 100, 200, 300, 500, 750, and 1,000.

The apparatus of the invention is equipped with storage means for relatively permanent storage of the data in the form shown in FIG. 2. Specifically an erasable PROM is provided and means for loading the PROM are also provided. The PROM can be loaded before the program is actually run, in which case any changes made by the override will not be in the PROM. If the PROM is loaded after the override changes are made, the changes will of course be in the PROM. To put it another way, the data that is displayed on the CRT when the PROM is loaded is the weld schedule data that is stored on the PROM. The PROM is preferably of an ultraviolet erasable type so that it can be erased clean if exposed to ultraviolet light. Scaling factors for the output channel signals of current and speed are also part of the data that is loaded into the PROM when the operator commands loading.

From the foregoing, it will be observed that numerous variations and modifications may be effected without departing from the true spirit and scope of the novel concept of the invention. It is to be understood that no limitation with respect to the specific apparatus illustrated herein is intended or should be inferred. It is, of course, intended to cover by the appended claims all such modifications as fall within the scope of the claims.

What is claimed is:

1. Apparatus for controlling a welding control parameter for a welder during a welding process comprising:

storage means for storing program data representative of: a length of a time interval (T) over which welding is to occur, an initial value of power (X0) to be supplied to a welding head at the beginning of said time interval, and a target value of power (X1) to be supplied to a welding at the termination of said time interval;

manually actuable input means for changing said target value (X1) during said time interval;

calculating means for repetitively and frequently calculating, during said time interval, the instantaneous value of power $X(t)$ to be supplied to a welding head according to the equation: $X(t)=(X1-X0)t/T+X0$, and for providing an output signal indicative of $X(t)$;

and weld power supply means responsive to the output value $X(t)$ of said calculating means for supplying power to a weld head given by the value $X(t)$, whereby the amount of power supplied to the welding head is calculated repetitively and frequently and whereby the adjustments for the amount of power supplied to the welding head can be made in real time during the welding interval.

2. The apparatus in accordance with claim 1 wherein said storage means stores data representative of:

an initial value of speed (Y0) of a welding head relative to a workpiece at the beginning of said time interval, and a target value of speed (Y1) of a welding head relative to a workpiece at the termination of said time interval;

and wherein said manually actuable input means includes means for changing said target value (Y1) during said time interval and wherein said calculating means repetitively and frequently calculates, during said time interval, the instantaneous value of relative speed between the welding head and work piece according to the equation:

$Y(t)=(Y1-Y0)t/T+Y0$, and for providing an output signal indicative of $Y(t)$; and further including welding head movement means responsive to the output value $Y(t)$ of said calculating means for moving said welding head relative to said workpiece at a speed given by the value $Y(t)$ and whereby the welding head is supplied with power and moved relative to the workpiece synchronously in time.

3. The apparatus as set forth in claim 1 wherein the storage means stores program data for a plurality of sequential time intervals and wherein the target value of power for one time interval is the initial value of power for the next successive time interval, to thereby provide a continuous output between said successive time intervals and to thereby provide flexibility for a welding program through the use of a plurality of intervals in cascade.

4. The apparatus as set forth in claim 1 wherein said storage means stores data representative of a pulse multiplier value and a pulse frequency value, and wherein oscillation means are provided to oscillate the power to the welding head between a first value provided by the equation and a second value given by the product of the value provided by the equation and the pulse multiplier, at a frequency dictated by the pulse frequency value.

5. The apparatus as set forth in claim 4 wherein said storage means stores data representative of a duty-cycle percentage on-time value and wherein the oscillation means, within each period of oscillation, produces the second value for a duration of time equal to the product of the percentage on-time value and the period of oscillation, and produces the first value for the remainder of said period of oscillation, to thereby provide a duty-cycle output signal to the weld head.

6. The apparatus as set forth in claim 1 wherein a visual display means is provided for displaying the values of the data stored in said storage means.

7. The apparatus as set forth in claim 7 wherein data for a number of successive time intervals is provided and wherein the visual display means includes means for highlighting in reverse video the displayed data for the particular time interval in progress.

8. The apparatus as set forth in claim 7 wherein means are provided for updating, in real time, the elapsed interval time and the instantaneous output signal for the particular time interval in progress.

9. Apparatus for controlling a welding control parameter for a welder during a welding process comprising:

storage means for storing program data representative of: a length of a time interval (T) over which welding is to occur, an initial value of power (X0) to be supplied to a welding head at the beginning of said time interval, and a target value of power (X1) to be supplied to a welding at the termination of said time interval;

manually actuable input means for changing said target value (X1) during said time interval;

calculating means for repetitively and frequently calculating, during said time interval, the instantaneous value of power $X(t)$ to be supplied to a welding head according to the equation:

$X(t+dt)=(X1-X(t))t/(T-t)+X(t)$ indicative of $X(t)$; and weld power supply means responsive to the output value $X(t)$ of said calculating means for supplying power to a weld head given by the value $X(t)$, whereby the amount of power supplied to the welding head is calculated repetitively and frequently and whereby the adjustments for the amount of power supplied to the welding head can be made in real time during the welding interval.

10. A method of controlling a welding parameter during a welding process comprising the steps of:
providing a programmer with data of:
a time interval (T) representative of the length of a welding process interval,
an initial value of power (X0) to be supplied to a welding head at the beginning of said time interval (T) yet to be commenced, and
a target value of power (X1) to be supplied to a welding head at the termination of said time interval (T) yet to be commenced;
providing said programmer with data representing desired changes to said target value (X1) during the time interval;
repetitively and frequently calculating during said time interval, the instantaneous value of power to be supplied to a welding head according to the equation: $X(t)=(X1-X0)t/T+X0$;
providing power to a welding head during said interval in an amount given by the value $X(t)$, whereby the amount of power supplied to the welding head is calculated repetitively and frequently and whereby adjustments can be made to the amount of power supplied to the welding head during the actual welding interval.

* * * * *